United States Patent
Hofmeister (10) Patent No.: US 7,630,432 B2
(45) Date of Patent: Dec. 8, 2009

(54) METHOD FOR ANALYSING THE CHANNEL IMPULSE RESPONSE OF A TRANSMISSION CHANNEL

(75) Inventor: Martin Hofmeister, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 566 days.

(21) Appl. No.: 10/541,850

(22) PCT Filed: Nov. 12, 2003

(86) PCT No.: PCT/EP03/12655

§ 371 (c)(1),
(2), (4) Date: Jul. 13, 2006

(87) PCT Pub. No.: WO2004/051865

PCT Pub. Date: Jun. 17, 2004

(65) Prior Publication Data

US 2006/0239385 A1   Oct. 26, 2006

(30) Foreign Application Priority Data

Dec. 3, 2002   (DE) ............................... 102 56 452

(51) Int. Cl.
 *H03H 7/40* (2006.01)
 *H04B 1/10* (2006.01)
 *G06F 17/10* (2006.01)
(52) U.S. Cl. .................. 375/232; 375/350; 708/323
(58) Field of Classification Search ............... 375/229, 375/230, 232, 233, 346, 350; 708/322, 323, 708/402–405
See application file for complete search history.

(56) References Cited

U.S. PATENT DOCUMENTS 5,337,366 A * 8/1994 Eguchi et al. ............ 381/71.11
5,926,455 A * 7/1999 Allpress .................... 370/210

(Continued)

FOREIGN PATENT DOCUMENTS

DE    100 52 718 A1    5/2002

(Continued)

OTHER PUBLICATIONS

Oppenheim, Alan V., et al., Discrete-Time Signal Processing, Prentice Hall, 1999, ISBN 0-13-754920-2, pp. 354, 355, 551-561.

(Continued)

*Primary Examiner*—Young T. Tse
(74) *Attorney, Agent, or Firm*—Fitzpatrick, Cella, Harper & Scinto (57) ABSTRACT

A method is provided for analyzing the channel impulse response of a transmission channel using a time-discrete adaptive equalizer connected in series to the transmission channel, which it equalizes. The method includes determining the IIR filter coefficients ($a_n$) of a recursive filter portion and the FIR filter coefficients ($b_n$) of a non-recursive filter portion of the time-discrete adaptive equalizer, at least partially allocating the IIR filter coefficients ($a_n$) and the FIR filter coefficients ($b_n$) to input vectors for a discrete Fourier transformation, determining output vectors from the input vectors using a discrete Fourier transformation, forming discrete transmission function values by division of the output vectors, and determining the channel impulse response from the channel transmission function using an inverse discrete Fourier transformation.

15 Claims, 4 Drawing Sheets

U.S. PATENT DOCUMENTS

| | | | | |
|---|---|---|---|---|
| 6,209,014 | B1 * | 3/2001 | Prasad | 708/322 |
| 2002/0001355 | A1 * | 1/2002 | Tore | 375/350 |

FOREIGN PATENT DOCUMENTS

| | | |
|---|---|---|
| EP | 0 402 145 A2 | 12/1990 |
| GB | 2 347 054 A | 8/2000 |

OTHER PUBLICATIONS

Shynk, J., Adaptive IIR Filtering, IEEE ASSP Magazine, vol. 6, Issue 2, Apr. 1989, pp. 4-21.

Kammeyer, K.D., "Nachrichtenübertragung", ISBN 3-519-16142-7, Stuttgart, pp. 196-205 (1996).

Stearns, S. D., "Digitale Verarbeitung analoger Signale", R. Oldenbourg Verlag München Wien 1979, München, Germany (1979).

* cited by examiner

METHOD FOR ANALYSING THE CHANNEL IMPULSE RESPONSE OF A TRANSMISSION CHANNEL

This application is the National Stage Filing of PCT/EP03/012655, filed Nov. 12, 2003, which in turn claims priority from DE102 56 452.3, filed Dec. 3, 2002.

BACKGROUND OF THE INVENTION

In general, when transmitting any signal via different transmission routes, a non-ideal transmission channel must be assumed. In travelling to the receiver, the signal may be attenuated and reflected, e.g., at connection points or obstacles. In the case of time-discrete systems, this signal is sampled in an A-D converter with a fixed clock pulse, synchronised by re-sampling at the n-fold multiple of the sampling rate (and/or of the symbol pulse) and the relevant signal level is allocated to a symbolic value. If the transmission channel is non-ideal, this leads to small eye-openings and, in extreme cases, to an incorrect symbol allocation. In order to compensate linear errors of the transmission channel, a receiver must contain an equaliser. This provides a system behaviour, which, in the case of an exact compensation of the linearity error, operates in an exactly inverse manner to the transmission behaviour of the transmission channel.

To improve the quality of reception of the transmitted message, general measures for the removal and/or restriction of transmission interference must be implemented alongside continuous compensation of the linearity error with an equaliser integrated in the receiver.

Suggested solutions, which represent the state of the art in this context, are presented in a textbook by K. D Kammeyer, "Nachrichtenabertragung" [Message Transmission] ISBN 3-519-16142-7. Stuttgart, 1996, pages 196-205. With these suggested methods, the coefficients of a series-connected equaliser required for optimum equalisation are calculated via iterative optimisation algorithms on the basis of pseudo-random sequences of transmission data and the associated data sequences received at the end of the transmission channel. A two-stage method, wherein the channel impulse response is determined in a first stage, and, the coefficients of the channel transmission function, which are in mirror-image to the coefficients of the equaliser in the case of an exact equalisation of the transmission channel, are calculated from the channel impulse response, in the second stage, does not exist.

SUMMARY OF THE INVENTION

The present invention is based on the object of developing a method, wherein the channel impulse response is determined using information available in the equaliser of the receiver, in order to provide a run-time measurement for the detection of obstacles in the transmission channel.

The filter coefficients of the equaliser are already available as a starting point for the method according to the invention. These can be determined with an adaptive method, e.g. with reference to Kammeyer, ibid. Since complete equalisation by the equaliser of the transmission signal subjected to linear distortion through the transmission channel is a prerequisite, the channel transmission function is inverse to the transmission function of the equaliser. Accordingly, after exchanging the denominator and numerator terms of the equaliser transmission function, the coefficients of the channel transmission function correspond exactly to the coefficients of the equaliser transmission function. The interpolation points of the channel impulse response are calculated from the z-transformed of the transmission channel using the inverse z-transformation according to the equation:

$$I_K(n) = (1/2\pi j) \oint H_K(z) \cdot z^{n-1} dz \quad (1)$$

Existing numerical methods for resolving ring-integrals in industrial practice are, on the one hand, too expensive and, on the other hand, do not provide sufficient accuracy for the present application. The invention overcomes this difficulty by using the inverse Fourier transformation from the discrete Fourier spectra of the transmission path to calculate the discrete sampled values of the channel impulse response, instead of the inverse z-transformation of the z-transformed of the transmission channel.

One necessary prerequisite for the use of the inverse Fourier transformation instead of the inverse z-transformation, is a limited number of interpolation points of the discrete time function to be transformed. Instead of the usual discrete time function, the invention uses the coefficients of the equaliser as input parameters for the implementation of the discrete Fourier transformation. In fact, if the discrete equaliser transmission function (the z-transformed)

$$H_E(z) = \frac{\sum_{n=0}^{k\_FIR} b_n \cdot z^{-n}}{1 + \sum_{n=1}^{k\_IIR} a_n \cdot z^{-n}} \quad (2)$$

is transferred via the permissible substitution $z = e^{(\sigma + j\omega)T}$ (where $\sigma = 0$, $\omega = 2\pi f$, T=symbol duration) into the formula:

$$H_E(f) = \frac{\sum_{n=0}^{k\_FIR} b_n \cdot e^{-j \cdot 2\pi \cdot n \cdot f \cdot T}}{1 + \sum_{n=1}^{k\_IIR} a_n \cdot e^{-j \cdot 2\pi \cdot n \cdot f \cdot T}} \quad (3)$$

and this is compared with the formula for calculation of the discrete Fourier spectra X(k) from the corresponding discrete time function:

$$X(k) = \frac{1}{N_F} \cdot \sum_{n=0}^{N_F - 1} x(n) \cdot e^{-j \cdot 2\pi k \cdot n / N_F} \quad (4)$$

a mathematical analogy for calculation of the discrete Fourier spectra X(k) from the discrete time function x(n) can be recognised in the numerator and denominator terms of the discrete transmission function $H_E(f)$ of the equaliser, if the following conditions are fulfilled:

1. The running index n of the algebraic sum in the denominator of $H_E(f)$ begins with 0 instead of the previous 1, and the coefficient $a_0$ is 1, so that the originally-initial 1 in the denominator term of $H_E(f)$ is integrated into the sum function 2. The sequences of the coefficients $a_n$ and $b_n$ of the discrete equaliser transmission function $H_E(f)$ are limited (n(denominator term)<=k_IIR, n(numerator term)<=k_FIR).

3. The number $N_F$ of interpolation points of the discrete Fourier transformation X(k) is greater than the maximum of the number of summands in the numerator term k_FIR or the number summands in the denominator term k_IIR.

4. From the combination of condition 2 and condition 3, it follows that the remaining coefficients $a_n$ with running indices between $k\_IIR$ and $N_F$, and $b_n$ with running indices between $K\_FIR$ and $N_F$ are 0

Now, the idea of the invention is to exploit this mathematical analogy. Because the sequence of coefficients $a_n$ and $b_n$ of the equaliser transmission function $H_E(f)$ is limited (condition 2) and all the other conditions listed above can be fulfilled, the coefficient sequences $a_n$ and $b_n$ of the equaliser transmission functions $H_E(f)$ can be used for the calculation of the discrete Fourier spectra of the transmission channel $H_k(f)$ instead of an appropriate discrete time function $x(n)$. For this purpose, the discrete Fourier spectra are calculated separately for the numerator and denominator of the equaliser transmission function $H_E(f)$ from the denominator coefficients $a_n$ and the numerator coefficients $b_n$. The desired discrete Fourier spectra of the transmission channel $H_k(f)$ are then obtained, taking into account the inverse transmission characteristic between the transmission channel and the equaliser, by dividing the denominator Fourier spectra obtained by the numerator Fourier spectra of the equaliser transmission function.

By contrast with the alternative of the z-transformation, the solution using the discrete Fourier transformation means that only a limited number of discrete Fourier spectra need to be calculated. However, the most significant advantage of the method according to the invention is the use of the fast Fourier transformation for the discrete Fourier transformation and also for the inverse discrete Fourier transformation. The efficiency of calculation can be significantly increased through the use of the fast Fourier transformation, for which the algorithm requires minimised calculation operations.

To provide a visually clear presentation of the discrete channel impulse response, the sampled values of the channel impulse response must be subjected to additional signal processing. This additional signal processing includes a formation of absolute-numbers for the complex interpolation points of the channel impulse response. An expedient presentation of the level values found in a semi-logarithmic scale corresponding to the presentation selected in FIG. 1, requires a logarithmation of the sampled values of the channel impulse response in the second processing stage. Finally, a comparison of the level of the individual interpolation points of the channel impulse response is supported by a scaling of the individual sampled values with reference to the largest sampled value. A sorted presentation of the scaled impulses represents a useful reduction of information for service personnel.

The individual pulses of the channel impulse response represent echo signals of the transmission impulse reflected at individual interference points in the transmission channel. A conversion of the locations in time (in micro seconds) of the impulses into corresponding distance data—by multiplication of the calculated time by the transmission velocity (in the case of radio transmission: the speed of light) therefore significantly simplifies the geographical identification of obstacles relative to the position of the mobile measuring equipment.

An exemplary embodiment of the invention is described in greater detail below with reference to the drawings. The drawings are as follows:

The method according to the invention for determining the channel impulse response in a time-discrete system is explained below with reference to FIGS. 1 to 5.

DETAILED DESCRIPTION OF THE PREFERRED EMBODIMENTS

Figure 2:
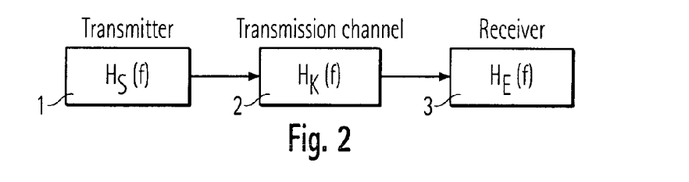
FIG. 2 shows a signal flow chart over a transmission path.

The invention described below assumes a transmission path as shown in FIG. 2. The transmitter 1 with the system behaviour described by the transmission function $H_S(f)$ transmits a signal, which is assumed to be ideal. This transmitted signal is transmitted via a transmission channel 2 (radio, cable, air, water etc.). The transmission behaviour of the transmission channel 2 is described by the transmission function $H_K(f)$. At the end of the transmission channel, the transmitted signal is received by the receiver 3, which has the transmission function $H_E(f)$. The receiver 3 contains, amongst other components, an equaliser 21, which equalises the transmission signal subjected to linear distortion by the transmission channel 2.

Figure 3:
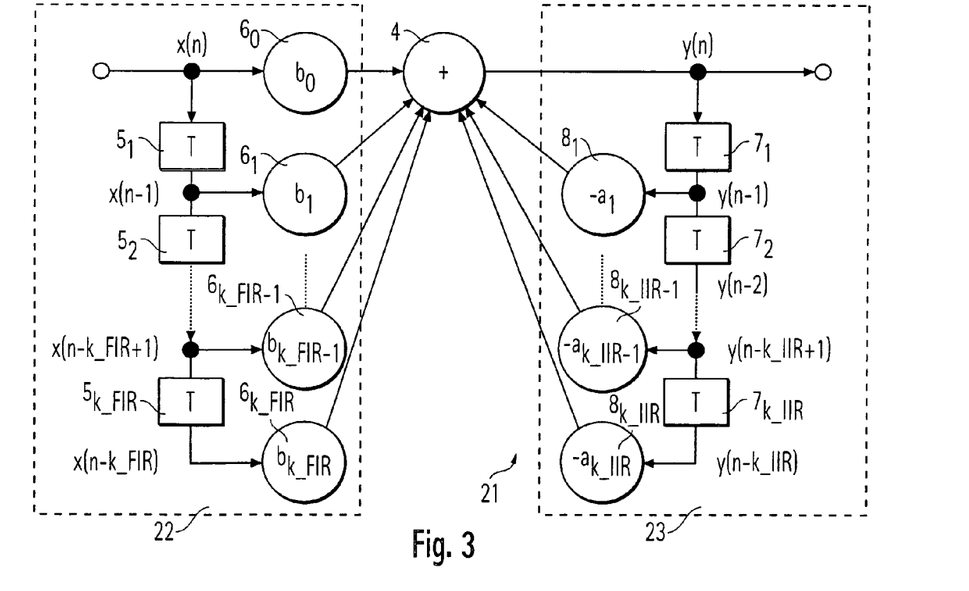
FIG. 3 shows a signal flow chart of an equaliser with a recursive and a non-recursive filter portion.

The equaliser 21 is determined by the device presented in FIG. 3. This device has a direct structure and consists of the non-recursive (finite-impulse-response=FIR) filter component 22, the recursive (infinite-impulse-response=IIR) filter component 23 and the summation element 4. The input signal of the non-recursive filter component 22 is the signal $x(n)$ received at the sampling-time index n, which is supplied to a first delaying element $5_1$. The delaying element $5_1$ delays the signal $x(n)$ by a sampling period T and therefore generates the signal $x(n-1)$. This signal $x(n-1)$ is delayed by a sampling period (and/or symbol duration) T by each of the further delaying elements connected in the chain, which have identical delaying behaviour to the first delaying element $5_1$. The number of delaying elements of the FIR component connected in the chain corresponds to the order k_FIR of the FIR-filtered components. Accordingly, the chain of delaying elements in the FIR filter component 22 continues after the delaying element $5_1$ with delaying element $5_2$ and ends with delaying element $5_{k\_FIR}$. The input signal of the last delaying element is therefore the signal $x(n-k\_FIR+1)$ received at the sampling time with the index $n-k\_FIR+1$, while the associated output signal is the signal $x(n-k\_FIR)$ received at the sampling time with the index $n-k\_FIR$.

After multiplication by the coefficient $b_0$ in the multiplier $6_0$, the received signal $x(n)$ is supplied to the summation element 4. In an identical manner, the delayed received signals $x(n-1)$ to $x(n-k\_FIR)$ generated in the individual delaying elements $5_1$ to $5_{k\_FIR}$ are multiplicatively combined and supplied to the summation element 4. The delayed received signal $x(n-1)$ generated by the delaying element $5_1$ is therefore supplied to the summation element 4 after multiplication by the coefficient $b_1$ in the multiplier $6_1$. The delayed received signal $x(n-k\_FIR)$ generated by the delaying element $5_{k\_FIR}$ is supplied to the summation element 4 after multiplication by the coefficient $b_{k\_FIR}$ in the multiplier $6_{k\_FIR}$.

The input signal of the recursive filter component 23 is at the same time the output signal of the equaliser 21 $y(n)$ at the sampling-time index n and corresponds to the output signal of the summation element 4. In the recursive filter component 23 of the device 1, the output signal y(n) of the equaliser is supplied at the sampling-time index n to a first delaying element $7_1$. This delaying element $7_1$, which has the same delaying characteristic as the delaying elements $5_1$ to $5_{k\_IIR}$ of the non-recursive filter component 22, generates as an output signal y(n–1) delayed by one sampling period relative to the output signal y(n). This once-delayed output signal y(n–1) is delayed by one further sampling period by each of the further delaying elements connected in the chain, which have identical delaying behaviour to the delaying element $7_1$. The number of delaying elements of the IIR filter component connected in the chain corresponds to the order k_IIR of the IIR filter components. The chain of delaying elements in the IIR filter component accordingly continues after the delaying element $7_1$ with delaying element $7_2$ and ends with delaying element $7_{k\_IIR}$. The input signal of the last delaying element is therefore the signal x(n–k_IIR+1) received at the sampling-time index n–k_IIR+1, while the associated output signal is the signal x(n–k_IIR) received at the sampling-time index n–k_IIR.

After multiplication with the coefficient $-a_1$ in the multiplier $8_1$, the once-delayed output signal y(n–1) generated in the delaying element $7_1$ is supplied to the summation element 4. The delayed output signals y(n–2) to y(n–k_IIR) generated by the remaining delaying elements $7_2$ to $7_{k\_IIR}$ are multiplicatively combined and supplied to the summation element 4 in an identical manner. The output signal y(n–k_IIR+1) generated by the delaying element $7_{k\_IIR-1}$ of the recursive filter portion 23 and delayed k_IIR–1-fold is then supplied to the summation element 4 after multiplication by the coefficient $-a_{k\_IIR-1}$ in the multiplier $8_{k\_IIR-1}$. The output signal y(n–k_IIR) generated by the delaying element $7_{k\_IIR}$ of the recursive filter portion 23 and delayed k_IIR-fold is supplied to the summation element 4 after multiplication by the coefficient $-a_{k\_IIR}$ in the multiplier $8_{k\_IIR}$.

The FIR component 22 provides a transmission behaviour with an impulse response of finite length. The FIR component 22 is used primarily for compensation of pre-echoes. The IIR component 23, by contrast, has a transmission behaviour with an impulse response of infinite length and is therefore primarily suitable for compensation of post-echoes. The coefficients $b_0$ to $b_{k\_FIR}$ and $-a_1$ to $-a_{k\_IIR}$ of the multipliers $6_0$ to $6_{k\_FIR}$ and $8_1$ to $8_{k\_IIR}$ are adjusted via adaptive optimisation methods in such a manner that the transmission behaviour of the equaliser is, in the ideal case, exactly inverse to the transmission behaviour of the transmission channel 2. In this manner, linear distortion of the transmitted signal, resulting from interference sources in the transmission channel 2 can be equalised by means of the equaliser. In time-discrete systems, additional interfering pre-echoes and post-echoes are produced by the linear distortion in the transmission channel 2 from the impulses transmitting the useful data; these are removed by the recursive and non-recursive filter structures of the equaliser.

Figure 4A:
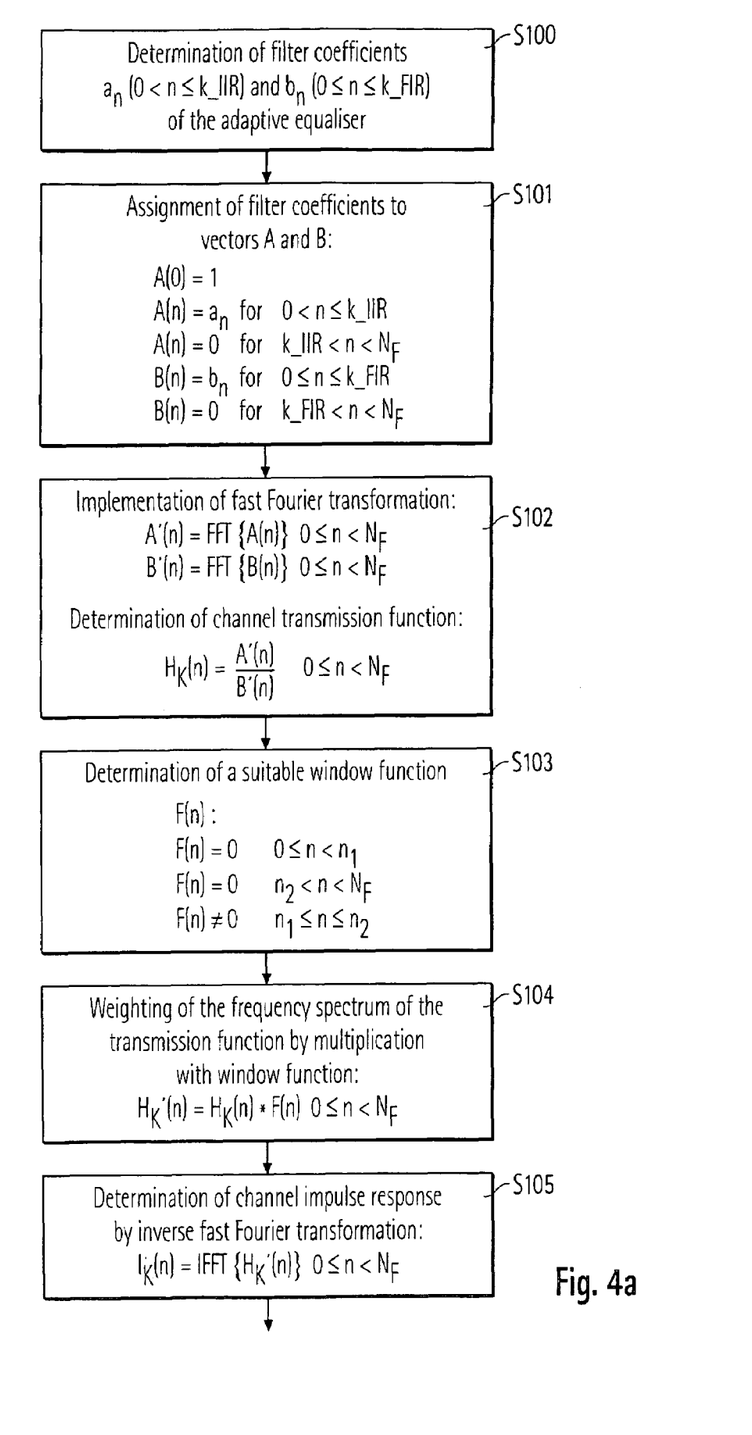
FIGS. 4a and 4b show a flow chart explaining the method according to the invention for determining the channel impulse response in a time-discrete system.
Figure 4B:
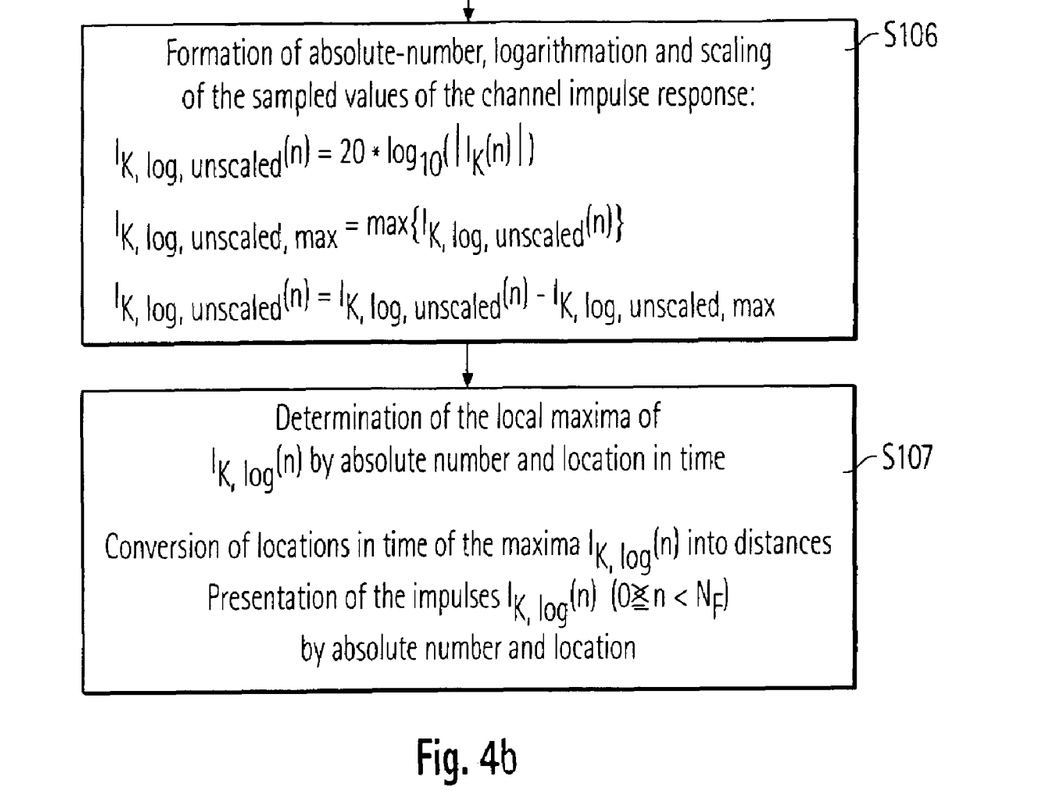

The associated FIGS. 4a and 4b provide an overview of the method according to the invention.

Determination of the filter coefficients $a_1$ to $a_{k\_IIR}$ and $b_0$ to $b_{k\_FIR}$ of the equaliser represents a first procedural stage S100 disposed before the actual invention within the procedure of the method for determining the channel impulse response according to FIG. 4. As mentioned above, the filter coefficients are determined on the basis of an adaptive optimisation algorithm, e.g. in accordance with K. D. Kammeyer, ibid.

In the next procedural stage S101, by way of preparation for calculating the discrete Fourier spectra of the transmission channel by means of discrete Fourier transformation, the input vector A(n) is pre-assigned for the calculation of the numerator-side discrete Fourier spectra A'(n), and the input vector B(n) is pre-assigned for the denominator-side discrete Fourier spectra B'(n). For this purpose, in the first part of procedural stage S101, the two input vectors A(n) and B(n), both of which have the length $N_F$, are provided. $N_F$ is the number of the sampled values in the time range and also in the frequency range of the Fourier transformation and, to be meaningful, should be greater than the maximum value of the coefficient number of the FIR component k_FIR the IIR component k_IIR of the equaliser. In the next part of procedural stage S101, the elements of the input vectors A(n) and B(n) are preferably assigned in the following manner:

$A(0)=1$ $A(n)=a_n$ for $0<n<=k\_IIR$ $A(n)=0$ for $k\_IIR<n<N_F$ $B(n)=b_n$ for $0<=n<=k\_FIR$ $B(n)=0$ for $k\_FIR<n<N_F$ The assignment of the input vectors A(n) and B(n) is based on the conditions already presented above for using the discrete Fourier transformation on the filter coefficients $a_n$ and $b_n$ of the equaliser instead of a discrete time function.

In the next procedural stage S102, the output vector A'(n), which corresponds to the numerator-side discrete Fourier spectra of the transmission function of the transmission channel $H_k(f)$, is calculated by means of the discrete Fourier transformation from the input vector A(n), using the formula (5):

$$A'(n) = \frac{1}{N_F} \cdot \sum_{k=0}^{N_F-1} A(k) \cdot e^{-j \cdot 2\pi k \cdot n/N_F} \text{ for } 0 <= n < N_F \qquad (5)$$

In an identical manner, the output vector B'(n), which corresponds to the denominator-side discrete Fourier spectra of the transmission function of the transmission channel $H_k(f)$, is calculated by means of the discrete Fourier transformation from the input vector B(n), using the formula (6):

$$B'(n) = \frac{1}{N_F} \cdot \sum_{k=0}^{N_F-1} B(k) \cdot e^{-j \cdot 2\pi k \cdot n/N_F} \text{ for } 0 <= n < N_F \qquad (6)$$

To reduce the number of multiplications and additions required for calculation of A'(n) and B'(n) using the formulae (5) and (6) respectively, the use of the fast discrete Fourier transformation (FFT, Fast Fourier Transform) is proposed, because this significantly reduces the volume of calculations by comparison with the usual discrete Fourier transformation without a loss of accuracy in the results.

The discrete Fourier spectra of the transmission channel $H_k(f)$ are determined by dividing the elements of the numerator-side output vector A'(n) by the elements of the denominator-side output vector B'(n) according to formula (7):

$H_k(n)=A'(n)/B'(n)$ for $0<=n<N_F$ \qquad (7)

Because of the periodising property of the discrete Fourier transformation, undesired deviations of the spectrum from the desired ideal characteristic occur in the context of the time limitation of the sampled values within the time range using a window function. These are known in the specialist literature as the leakage effect—a spectral broadening of the spectrum—and the lattice effect—a falsification of the absolute number of the sampled values of the spectrum. To minimise these leakage and lattice effects, the discrete Fourier spectra of the transmission channel $H_k(n)$ are preferably weighted with an optimised window function $F(n)$, the form of which is adapted to the modulation signal used. Determining the window function $F(n)$ represents the content of procedural stage S103. To implement the weighting or the multiplication of the discrete Fourier spectrum of the transmission channel $H_k(n)$ by the window function $F(n)$, the length of the window-function vector $F(n)$ must correspond to the length $N_F$ of the discrete Fourier vector of the transmission channel spectrum $H_k(n)$. The elements of the window function vector $F(n)$ are assigned as follows:

$$F(n)=0 \text{ for } 0<=n<n_1$$

$$F(n)=0 \text{ for } n_2<n<N_F$$

$$F(n)\neq 0 \text{ for } n_1<=n<=n_2$$

The lower and upper threshold frequency $n_1$ and $n_2$ of the window function $F(n)$ are established in dependence upon the modulation type of the signal to be transmitted, because the modulation type determines the position and the width of the discrete Fourier spectrum of the transmission signal, which consists of the carrier and the useful signal, as yet not demodulated in the receiver 3, within the frequency space. For a single-sideband signal (e.g. 8 VSB: Vestigial Side Band), it is advisable to set $n_1=0$ and $n_2=N_F/2-1$, while for a double-side band signal (e.g. QAM: Quadrature Amplitude Modulation) the setting should preferably be $n_1=0$ and $n_2=N_F-1$.

Various mathematical functions can be used for the choice of window function $F(n)$ in the lower and upper threshold frequency $n_1$ and $n_2$. Within the framework of the method according to the invention for determining the channel impulse response in a time-discrete system, a window function $F(n)$ corresponding to the formula (8) is preferably used:

$$F(n) = a - b \cdot \cos\left(2\pi \cdot \frac{n-n_1}{n_2-n_1}\right) + c \cdot \cos\left(4\pi \cdot \frac{n-n_1}{n_2-n_1}\right) \quad (8)$$

The form of the window function $F(n)$ can be further adapted in an application-specific and/or operation-specific manner using the parameters a, b and c.

In the next procedural stage S104, the discrete Fourier spectra of the transmission channel $H_k(n)$ determined in procedural stage S102 are weighted to minimise the leakage effects and lattice effects with reference to the window function by multiplication using the formula (9).

$$H'_k(n)=H_k(n)\cdot F(n) \text{ for } 0<=n<N_F \quad (9)$$

The frequency-limited, discrete channel transmission function $H'_k(n)$ provides a suitable spectral function, from which the discrete channel impulse response $I_k(n)$ can be determined in procedural stage S105 by means of inverse discrete Fourier transformation. The discrete channel impulse response $I_k(n)$ is calculated according to the formula (10).

$$I_k(n) = \sum_{k=0}^{N_F-1} H'_k(k) \cdot e^{j\cdot 2\pi k \cdot n/N_F} \text{ for } 0<=n<N_F \quad (10)$$

To achieve a meaningful improvement in the efficiency of calculation, the fast Fourier transformation (IFFT, Inverse Fast Fourier Transform) can also be used, in the same manner as the discrete Fourier transformation in formulae (5) and (6), for the inverse discrete Fourier transformation according to formula (10).

To present the discrete channel impulse response $I_k(n)$ in a graphic form useful to the user when implementing service measurements, additional signal processing stages must be carried out. In this context, in a first part of procedural stage S106, absolute numbers are formed from the complex interpolation points of the channel impulse response $I_k(n)$. The interpolation points of the channel impulse response $I_k(n)$, the level of which may be scattered over several decades, are also logged to provide a meaningful presentation in a semi-logarithmic scale. The formation of absolute-numbers and logarithmation of the discrete channel impulse response $I_k(n)$ is carried out using the formula (11).

$$I_{K, \, log, unscaled}(n)=20*\log_{10}(|I_K(n)|) \text{ for } 0<=n<N_F \quad (11)$$

For a comparison of the level of individual interpolation points of the channel impulse response $I_k(n)$ in a graphic form, a scaling of all interpolation points with a reference parameter is proposed. Since the maximum interpolation point of the channel impulse response $I_k(n)$ represents an appropriate reference parameter, the maximum value $I_{k, \, log, \, unscaled, max}$ is sought, in the next part of the procedural stage S106, from all $N_F$ interpolation points of the channel impulse response $I_{k, \, log, \, unscaled}(n)$ using the formula (12).

$$I_{k, \, log, unscaled, max}=\max\{I_{k, \, log, unscaled}(n)\} \text{ for } 0<=n<N_F \quad (12)$$

The scaling of the unscaled interpolation points of the channel impulse response $I_{k, \, log, unscaled}(n)$ with reference to the maximum interpolation point $I_{k, \, log, unscaled, max}$ can be seen with reference to formula (13)

$$I_{k, \, log}(n)=I_{k, \, log, unscaled}(n)-I_{k, \, log, unscaled, max} \text{ for }$$
$$0<=n<N_F \quad (13)$$

Figure 5:
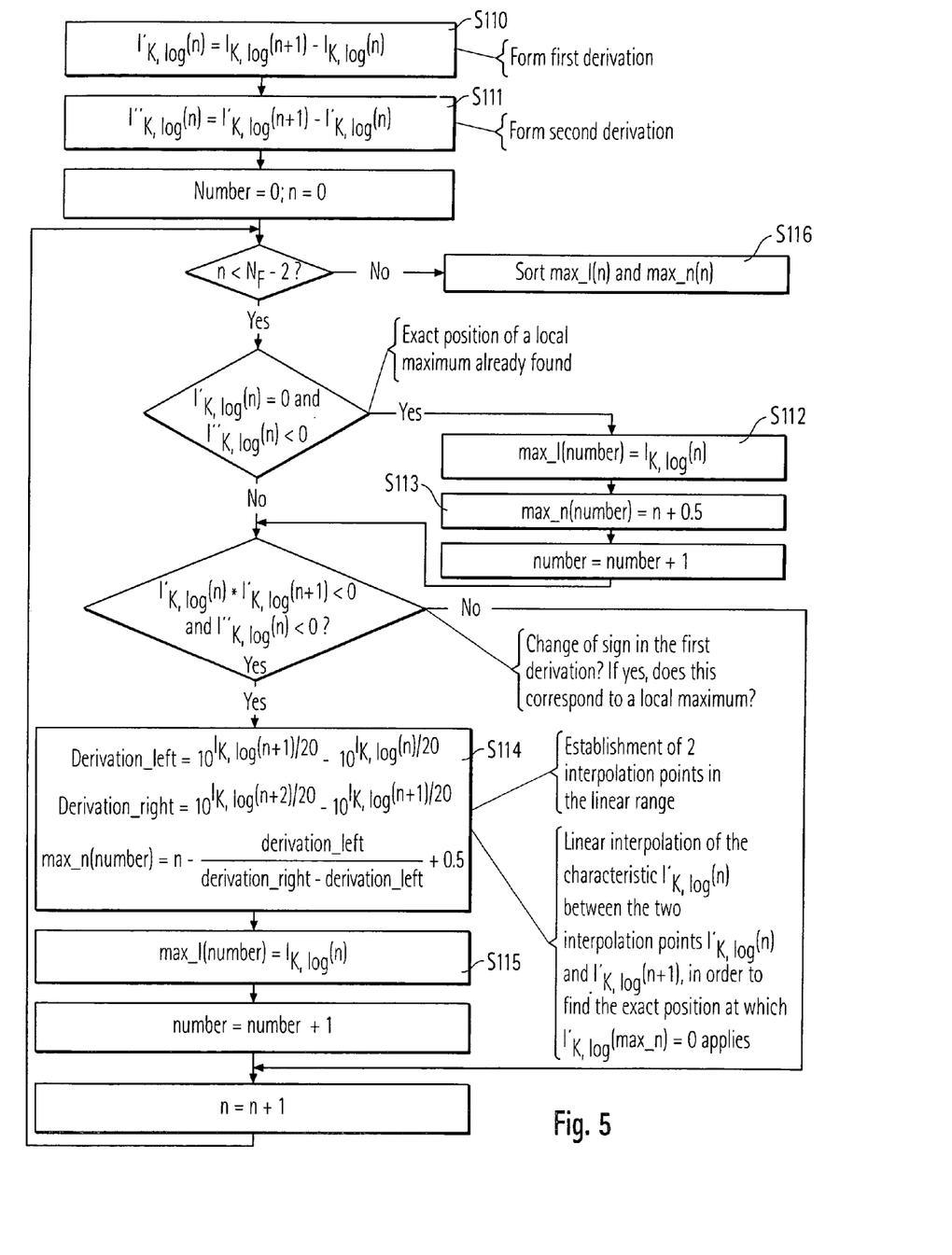
FIG. 5 shows a flow chart explaining the method according to the invention for determining the local maxima of the interpolation points of a channel impulse response.

In the context of service measurements in practice, a plurality of echo impulses are often contained in the channel impulse response, which can then no longer be handled by the service personnel. A reduction of information, selecting, for example, a sorted presentation on the basis of the 10 largest echo signals is therefore meaningful in this context. Accordingly, the next procedural stage S107 contains a search for local maxima of the scaled interpolation points of the channel impulse response $I_k(n)$. The method according to the invention for searching for the local maxima of the channel impulse response $I_k(n)$ and sorting the maxima obtained according to the size of their absolute number is shown in FIG. 5 and will be explained in greater detail in a later section.

To detect the geographical position of obstacles in the transmission channel, it is more relevant for the service personnel to determine the corresponding distance of the obstacles from the current position of the mobile measurement receiver, instead of determining the time of reception of the echo signals generated by the obstacles. The location in time of the largest echo signals of the channel impulse response $I_k(n)$, as determined in the preceding part of this procedural stage, is converted, in the next part of this stage, into the corresponding distance by multiplying the location in time by the transmission velocity.

Figure 1:
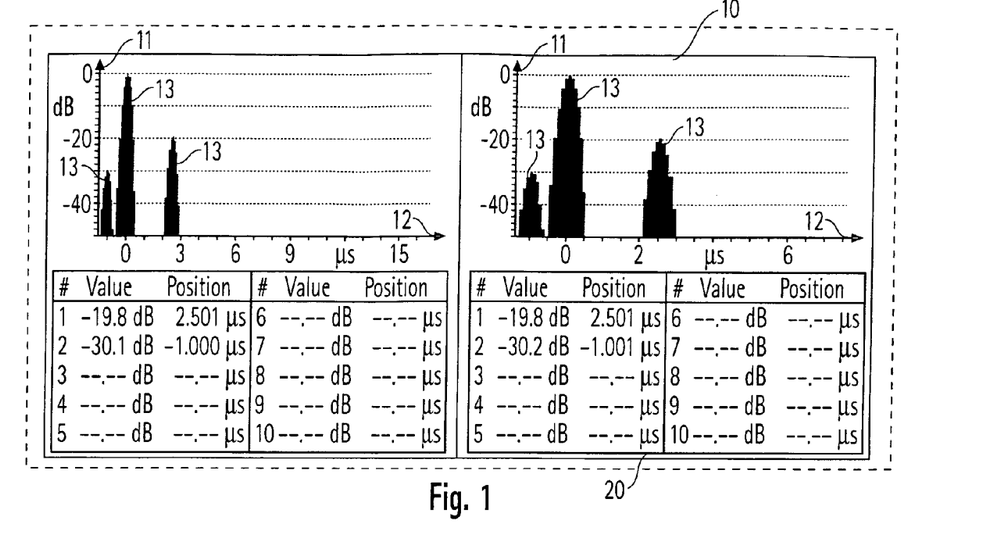
FIG. 1 shows an example of a graphic representation of the channel impulse response.

In the last part of the procedural stage S107, the graphic representation of the discrete channel impulse response $I_k(n)$ finally takes place as shown in FIG. 1.

The graphic representation shown in FIG. 1 contains within the graphic region 10, the graphic presentation of the channel impulse response $I_k(n)$ with a tabular listing of the ten numerically largest interpolation points of the channel impulse response $I_k(n)$ shown in the tabular region 20, by way of example. The graphic region 10 contains a semi-logarithmic diagram with an ordinate axis 11, which has a logarithmic scale with the unit dB and is the reference axis for the level of the interpolation points of the channel impulse response $I_k(n)$, and an abscissa access 12, which has a linear scale with the unit μs and is the reference axis for the location in time of the interpolation points of the channel impulse response $I_k(n)$. In this semi-logarithmic diagram, the individual interpolation points of the channel impulse response $I_k(n)$ are positioned as level bars 13, whose heights correspond to the levels of the interpolation points at the position on the abscissa 12, which corresponds to their location in time. In a three-column table in the tabular region, the ten numerically largest interpolation points of the channel impulse response $I_k(n)$ are presented, sorted in descending sequence according to their absolute numerical value. The first column contains the sequential order; the second column contains the absolute number of the level; and the third column contains the location in time of the interpolation point of the channel impulse response $I_k(n)$.

As mentioned above in connection with procedural stage S107, the sub-routine for searching for a local maximum of the interpolation points of the channel impulse response $I_k(n)$, which is illustrated in FIG. 5, begins in procedural stage S110 with the calculation of the first derivation $I_k'(n)$ of the discrete interpolation point sequence $I_k(n)$ of the channel impulse response using the formula (14).

$$I_{K,\ log}'(n) = I_{k,\ log}(n+1) - I_{k,\ log}(n) \text{ for } 0 <= n < N_F - 1 \quad (14)$$

In the next stage S111, the second derivation $I_k''(n)$ of the sequence of discrete interpolation points $I_k(n)$ of the channel impulse response is calculated using the formula (15).

$$I_{K,\ log}''(n) = I_{k,\ log}'(n+1) - I_{k,\ log}'(n) \text{ for } 0 <= n < N_F - 2 \quad (15)$$

After the running variables "number" for the local maxima of the interpolation points of the channel impulse response $I_k(n)$, which have been found, and n for the interpolation points of the channel impulse response $I_k(n)$ have been initialised by zeroing, an inquiry is carried out on the basis of a question regarding whether the running variable n is less than $N_F - 2$, to establish whether or not all interpolation points have been investigated in the search for a local maximum. In the case of a negative answer to the inquiry, in procedural stage S116, the local maxima of the interpolation points $I_k(n)$ of the channel impulse response found in the search procedure with the value max_I(n) and the location in time max_n(n) are sorted according to the size of the absolute number max_I(n).

In the case of a positive answer to the inquiry, the next question, regarding whether the first derivation $I'_{k,\ log}(n)$ of the sequence of interpolation points between the sampling times n and n+1 is equal to zero and whether, at the same time, the second derivation $I''_{k,\ log}(n)$ of the sequence of interpolation points at the sampling time n+1 is less than zero, determines whether a local maximum is present between the two sampling times n and n+1. In the event of a positive answer to this inquiry, the next element of the vector max_I(number) for the absolute numbers of the local maxima found is assigned, in the following procedural stage S112, to the absolute number of the interpolation point $I_k(n)$ just determined using formula (16).

$$\text{Max\_I(number)} = I_{k,\ log}(n) \quad (16)$$

In the next stage S113, the next element of the vector max_n(number) for the locations in time of the local maxima found is assigned using the formula (17).

$$\text{Max\_n(number)} = n + 0.5$$

This denotes that the number-$^{th}$ maximum is preseht exactly between n and n+1. Processing of the POSITIVE answer to the last-named inquiry is ended by incrementing the running variable "number" for the local maxima found.

The end of this processing sequence, and also a NEGATIVE answer to the last inquiry, leads to a further check to determine a possible local maximum between two interpolation points at the sampling time n and n+1, which is not located exactly in the middle between the two points n and n+1, if the product of the first derivation $I'_{k,\ log}(n)$ of the interpolation point sequence at the sampling time n and the first derivation $I'_{k,\ log}(n+1)$ of the interpolation point sequence at the sampling time n+1 is less than zero and, at the same time, the second derivation $I''_{k,\ log}(n)$ of the interpolation point sequence at the sampling time n is less than zero.

In the case of a positive answer to the inquiry, the next element of the vector max_n(number) of the location in time of the local maximum found is determined in procedural stage S114 using the formulae (18), (19) and (20), $$\text{derivation\_left} = 10^{I_{K,\log}(n+1)/20} - 10^{I_{K,\log}(n)/20} \quad (18)$$

$$\text{derivation\_right} = 10^{I_{K,\log}(n+2)/20} - 10^{I_{K,\log}(n+1)/20} \quad (19)$$

$$\text{max\_n(number)} = n - \frac{\text{derivation\_left}}{\text{derivation\_right} - \text{derivation\_left}} + 0.5 \quad (20)$$

In procedural stage S115, the next element of the vector max_I(number) is assigned to the absolute number of the local maximum found using the formula (21).

$$\text{Max\_I(number)} = I_{k,\ log}(n) \quad (21)$$

Processing the POSITIVE answer to the last-named inquiry is ended by incrementing the running variable "number" for the local maxima found.

As a final calculation of the algorithm according to the invention, in the case of a POSITIVE answer and a NEGATIVE answer to the last-named inquiry, the running variable n for the interpolation points of the channel impulse response $I_k(n)$ is incremented for the investigation of the next interpolation point and branched back to the input of the first inquiry.

The time resolution of the local maxima of the interpolation points of the channel impulse response $I_k(n)$ can be significantly increased with the calculations carried out in procedural stage S114 of the method illustrated in FIG. 5, if the local maximum is not located exactly in the middle between two sampling points n and n+1. The method provides a possible solution for increasing the time resolution. The sampled values of the first derivation $I_k'(n)$ are approximated using a linear traverse, of which the passage through zero represents the exact position of the local maximum. A higher time-resolution in the interpolation can be achieved by using functions of a higher order (e.g. spline functions or parabolic sections).

The invention claimed is:

1. A method for identifying obstacles in a transmission channel by means of propagation-delay measurement through analysis of a discrete channel impulse response ($I_k(n)$) of the transmission channel using a time-discrete adaptive equalizer connected in series to the transmission channel, the method comprising:

determining IIR filter coefficients ($a_n$) of a recursive filter portion of the time-discrete adaptive equalizer and FIR filter coefficients ($b_n$) of a non-recursive filter portion of the time-discrete adaptive equalizer;

assigning the IIR filter coefficients ($a_n$) to a first input vector (A(n)) correspondingly, wherein a first vector element (A(n=0)) of the first input vector (A(n)) is pre-assigned with a value of 1 and remaining vector elements (A(n≠0)) of the first input vector (A(n)) are pre-assigned with zeros;

assigning the FIR filter coefficients ($b_n$) to a second input vector (B(n)) correspondingly, wherein vector elements of the second input vector (B(n)) are pre-assigned with zeros;

determining a first output vector (A'(n)) from the first input vector (A(n)) and a second output vector (B'(n)) from the second input vector (B(n)) using a discrete Fourier transformation;

forming a discrete channel transmission function ($H_k(n)$) by dividing the first output vector (A'(n)) by the second output vector (B'(n));

determining the discrete channel impulse response ($I_k(n)$) from the discrete channel transmission function ($H_k(n)$) using an inverse discrete Fourier transformation;

determining local maxima of the discrete channel impulse response ($I_k(n)$) according to locations in time; and converting the locations in time of the local maxima into corresponding distances of the obstacles relative to a position of a measurement receiver containing the time-discrete adaptive equalizer by multiplication by a transmission rate.

2. The method according to claim 1, wherein:

the first output vector A'(n) is formed by the discrete Fourier transformation of the first input vector A(n) assigned with the IIR filter coefficients using the formula:

$$A'(n) = \frac{1}{N_F} \cdot \sum_{k=0}^{N_F-1} A(k) \cdot e^{-j \cdot 2\pi k \cdot n / N_F} \text{ for } 0 <= n < N_F;$$

the second output vector B'(n) is formed by the discrete Fourier transformation of the second input vector B(n) assigned with the FIR filter coefficients using the formula:

$$B'(n) = \frac{1}{N_F} \cdot \sum_{k=0}^{N_F-1} B(k) \cdot e^{-j \cdot 2\pi k \cdot n / N_F} \text{ for } 0 <= n < N_F;$$

and the discrete channel transmission function $H_k(n)$ is formed using the formula:

$H_k(n) = A'(n)/B'(n) \text{ for } 0 <= n < N_F,$ where $N_F$ is a number of sampled values for the discrete Fourier transformation, n is an index, which determines the interpolation points of the first and second output vectors, and k is an index, which determines the interpolation points of the first and second input vectors.

3. The method according to any one of claims 1 to 2, wherein the discrete channel impulse response $I_k(n)$ is formed using the formula:

$$I_k(n) = \sum_{k=0}^{N_F-1} H_k(k) \cdot e^{j \cdot 2\pi k \cdot n / N_F}$$

where $H_K(n)$ is the discrete channel transmission function, $N_F$ is the number of sampled values for the discrete Fourier transformation, k is an index, which determines discrete frequency values, and n determines the sampled values of the discrete channel impulse response.

4. The method according to any one of claims 1 to 2, wherein, after determining the discrete channel impulse response $I_k(n)$, procedural stages of forming an absolute number, logarithmation and scaling of the discrete channel impulse response $I_k(n)$ are implemented.

5. The method according to claim 4, wherein the forming of the absolute number and logarithmation of the discrete channel impulse response $I_k(n)$ are implemented using the formula:

$I_{k,\,log,unscaled}(n) = 20 * \log_{10}(|I_k(n)|).$

6. The method according to claim 5, wherein the scaling of the discrete channel impulse response $I_k(n)$ is formed by seeking the largest sampled value in terms of an absolute number $I_{k,\,log,unscaled,max}(n)$ using the following function:

$I_{k,\,log,unscaled,max}(n) = \max\{I_{k,\,log,unscaled}(n)\}$ and subsequent calculation using the formula:

$I_{k,\,log}(n) = I_{k,\,log,unscaled}(n) - I_{k,\,log,unscaled,max}(n).$

7. The method according to claim 6, wherein, before determining the discrete channel impulse response $I_k(n)$, a weighting of the discrete channel transmission function $H_k(n)$ with a window function (F(n)) is implemented in order to obtain a frequency-band-limited channel transmission function ($H_k'(n)$) using the formula:

$H_k'(n) = H_k(n) \cdot F(n).$

8. The method according to claim 7, wherein the function $F(n) = 0 \text{ for } 0 <= n <= n_1$ $F(n) = 0 \text{ for } n_2 < n < N_F$ $F(n) \neq 0 \text{ for } n_1 <= n <= n_2$ is selected as the window function, where n determines discrete frequency values, $N_F$ is the number of sampled values for the discrete Fourier transformation, $n_1$ is a lower threshold frequency of the window function F(n), and is dependent upon a modulation type of a signal to be transmitted, and $n_2$ is an upper threshold frequency of the window function F(n), and is dependent upon the modulation type of the signal to be transmitted.

9. The method according to claim 8, wherein the window function F(n) is formed using the formula:

$$F(n) = a - b \cdot \cos\left(2\pi \cdot \frac{n-n_1}{n_2-n_1}\right) + c \cdot \cos\left(4\pi \cdot \frac{n-n_1}{n_2-n_1}\right)$$

for $n_1 <= n <= n_2$, where
- n determines the discrete frequency values,
- a, b, c are freely selectable parameters determining a form of the window function F(n),
- $n_1$ is the lower threshold frequency of the window function F(n), and is dependent upon the modulation type of the signal to be transmitted, and
- $n_2$ is the upper threshold frequency of the window function F(n), and is dependent upon the modulation type of the signal to be transmitted.

10. The method according to claim 6, wherein, after the forming of the absolute-number, logarithmation and scaling of the discrete channel impulse response $I_k(n)$, the local maxima of the scaled sampled values $I_{k,\,log}(n)$ of the discrete channel impulse response ($I_k(n)$) are determined according to the absolute number.

11. The method according to claim 10, wherein the determining of the local maxima of the scaled sampled values $I_{k,\,log}(n)$ of the discrete channel impulse response $I_k(n)$ comprises the following procedural stages:

forming a first derivation ($I_{k,\,log}'(n)$) of the discrete values of the discrete channel impulse response ($I_k(n)$);

forming a second derivation ($I_{k,\,log}''(n)$) of the discrete values of the discrete channel impulse response ($I_k(n)$);

determining absolute numbers (max_I(number)) and the locations in time (max_n(number)) of the local maxima, if the first derivation is zero and the second derivation is negative;

determining the locations in time (max_n(number)) of the local maxima via linear interpolation of the first derivation by means of three discrete values ($I_{k,\,log}(n)$, $I_{k,\,log}(n-1)$, $I_{k,\,log}(n-2)$), and of the associated absolute number (max_I(number)) of the local maxima, if a product of the first derivations at two adjacent interpolation points (n, n−1) and the second derivation is negative; and sorting the absolute numbers (max_I(number)) and the locations in time (max_n(number)) of the local maxima found, when the search procedure is concluded.

12. The method according to claim 11, wherein, after determining the local maxima of the discrete channel impulse response $I_k(n)$ and converting the locations in time into corresponding distances, individual discrete interpolation-point values of the discrete channel impulse response $I_k(n)$ and of the local maxima of the discrete channel impulse response $I_k(n)$ are presented in graphical and/or tabular form.

13. A digital storage medium having electronically-readable control logic stored thereon, which direct a computer or digital signal processor to carry out the method of any of claims 1 to 2.

14. A computer program product comprising a computer-readable medium embodying instructions executable by a digital signal processor for implementing the method of any of claims 1 to 2.

15. A computer-readable medium having stored thereon sequences of instructions, the sequences of instructions including instructions, which, when executed by a computer or a digital signal processor, cause the computer or the digital signal processor to perform the method of any of claims 1 to 2.

* * * * *

UNITED STATES PATENT AND TRADEMARK OFFICE
CERTIFICATE OF CORRECTION

PATENT NO. : 7,630,432 B2  
APPLICATION NO. : 10/541850  
DATED : December 8, 2009  
INVENTOR(S) : Martin Hofmeister It is certified that error appears in the above-identified patent and that said Letters Patent is hereby corrected as shown below:

COLUMN 1

Line 34, "Nachrichtenabertragung" should read --Nachrichtenübertragung--.

COLUMN 2

Line 59, "function" should read --function.--.  
    Line 67, "summonds" should read --of summands--.

COLUMN 3

Line 4, "are 0" should read --are 0.--.

COLUMN 6

Line 9, "FIR component k_FIR the IIR" should read --FIR component k-FIR and the IIR--.

COLUMN 7

Line 29, "double-side band" should read --double-sideband--.

COLUMN 8

Line 32, "formula (13)" should read --formula (13).--.

COLUMN 10

Line 1, "preseht" should read --present--.  
    Line 8, "sampling time n and n+1" should read --sampling times n and n+1,--.

Signed and Sealed this

Fourth Day of May, 2010

David J. Kappos  
*Director of the United States Patent and Trademark Office*

COLUMN 14

Line 4, "$I_{k,\ log}(n-1)$, $I_{k,\ log}(n-2)$" should read --$I_{k,\ log}(n+1)$, $I_{k,\ log}(n+2))$,--.
Line 7, "points (n, n-1)" should read --points (n, n+1)--.